United States Patent
Rodewald et al.

(10) Patent No.: US 6,927,269 B2
(45) Date of Patent: Aug. 9, 2005

(54) FUNCTIONALIZED ELASTOMERS

(75) Inventors: Stephan Rodewald, Canal Fulton, OH (US); Steven Kristofer Henning, Hudson, OH (US); Brian Earl Burkhart, Wadsworth, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 317 days.

(21) Appl. No.: 10/610,206

(22) Filed: Jun. 30, 2003

(65) Prior Publication Data

US 2004/0063890 A1 Apr. 1, 2004

Related U.S. Application Data

(63) Continuation-in-part of application No. 10/247,243, filed on Sep. 19, 2002, now Pat. No. 6,627,721.

(51) Int. Cl.$^7$ .............................................. C08F 236/14
(52) U.S. Cl. ..................... 526/338; 526/258; 526/265; 526/340; 525/332.3; 525/342; 525/371
(58) Field of Search ................................. 526/258, 265, 526/338; 525/332.3, 342, 371

(56) References Cited

U.S. PATENT DOCUMENTS

| | | | |
|---|---|---|---|
| 4,935,471 A | 6/1990 | Halasa et al. | 525/359 |
| 5,932,662 A | 8/1999 | Lawson et al. | 525/280 |
| 6,080,835 A | 6/2000 | Lawson et al. | 528/396 |
| 6,084,025 A | 7/2000 | Kitamura et al. | 524/575 |
| 6,111,045 A | 8/2000 | Takagishi et al. | 526/338 |
| 6,211,321 B1 | 4/2001 | Takagishi et al. | 526/335 |
| 6,344,538 B1 | 2/2002 | Sheares | 528/396 |
| 6,627,721 B1 * | 9/2003 | Rodewald et al. | 526/338 |

* cited by examiner

Primary Examiner—Fred Teskin
(74) Attorney, Agent, or Firm—Alvin T. Rockhill

(57) ABSTRACT

This invention discloses a rubbery polymer which is comprised of repeat units that are derived from (1) at least one conjugated diolefin monomer, and (2) at least one functionalized monomer having of the structural formula:

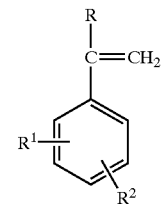

wherein R represents an alkyl group containing from 1 to about 10 carbon atoms or a hydrogen atom, and wherein $R^1$ and $R^2$ can be the same or different and represent hydrogen atoms or a moiety of the structural formula:

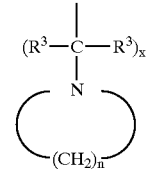

wherein the $R^3$ groups in repeat units and in different repeat units can be the same or different and represent hydrogen atoms or alkyl groups containing from 1 to about 4 carbon atoms, wherein n and x represents integers from 1 to about 10, with the proviso that $R^1$ and $R^2$ can not both be hydrogen atoms.

20 Claims, No Drawings

FUNCTIONALIZED ELASTOMERS

This is a continuation-in-part application of U.S. patent application Ser. No. 10/247,243, filed on Sep. 19, 2002 (now issued as U.S. Pat. 6,627,721).

BACKGROUND OF THE INVENTION

It is important for rubbery polymers that are used in tires, hoses, power transmission belts and other industrial products to have good compatibility with fillers, such as carbon black and silica. To attain improved interaction with fillers such rubbery polymers can be functionalized with various compounds, such as amines. U.S. Pat. No. 4,935,471 discloses a process for preparing a polydiene having a high level of affinity for carbon black which comprises reacting a metal terminated polydiene with a capping agent selected from the group consisting of (a) halogenated nitriles having the structural formula X—A—C≡N, wherein X represents a halogen atom and wherein A represents an alkylene group containing from 1 to 20 carbon atoms, (b) heterocyclic aromatic nitrogen containing compounds, and (c) alkyl benzoates. The capping agents disclosed by U.S. Pat. No. 4,935,471 react with metal terminated polydienes and replace the metal with a terminal cyanide group, a heterocyclic aromatic nitrogen containing group or a terminal group which is derived from an alkyl benzoate. For example, if the metal terminated polydiene is capped with a nitrile, it will result in the polydiene chains being terminated with cyanide groups. The use of heterocyclic aromatic nitrogen containing compounds as capping agents can result in the polydiene chains being terminated with a pyrrolyl group, an imidazolyl group, a pyrazolyl group, a pyridyl group, a pyrazinyl group, a pyrimidinyl group, a pyridazinyl group, an indolizinyl group, an isoindolyl group, a 3-H-indolyl group, a cinnolinyl group, a pteridinyl group, a β-carbolinyl group, a perimidinyl group, a phenanthrolinyl group or the like.

U.S. Pat. No. 4,935,471 also discloses that lithium amides are highly preferred initiators because they can be used to prepare polydienes which are terminated with polar groups at both ends of their polymer chains. The extra polar functionality provided by lithium amides results in increased interaction with carbon black resulting in better polymer-carbon black dispersion. The lithium amides disclosed by U.S. Pat. No. 4,935,471 include lithium pyrrolidide. U.S. Pat. No. 4,935,471 also indicates that preferred initiators include amino alkyl lithium compounds of the structural formula:

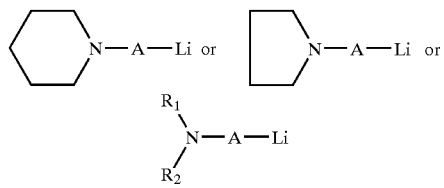

wherein A represents an alkylene group containing from 1 to 20 carbon atoms, and wherein $R_1$ and $R_2$ can be the same or different and represent alkyl groups containing from 1 to 20 carbon atoms.

It is also desirable for synthetic rubbers to exhibit low levels of hysteresis. This is particularly important in the case of rubbers that are used in tire tread compounds. Such polymers are normally compounded with sulfur, carbon black, accelerators, antidegradants and other desired rubber chemicals and are then subsequently vulcanized or cured into the form of a useful article. It has been established that the physical properties of such cured rubbers depend upon the degree to which the carbon black is homogeneously dispersed throughout the polydiene rubber. This is in turn related to the level of affinity that carbon black has for the rubber. This can be of practical importance in improving the physical characteristics of rubber articles that are made utilizing polydiene rubbers. For example, the rolling resistance and tread wear characteristics of tires can be improved by increasing the affinity of carbon black to the rubbery polymers utilized therein. Therefore, it would be highly desirable to improve the affinity of a given polydiene rubber for carbon black and/or silica. This is because a better dispersion of carbon black throughout polydiene rubbers which are utilized in compounding tire tread compositions results in a lower hysteresis value and consequently tires made therefrom have lower rolling resistance. It is also known that a major source of hysteresis is due to polymer chain ends that are not capable of full elastic recovery. Accordingly, improving the affinity of the rubber chain ends to the filler is extremely important in reducing hysteresis.

U.S. Pat. No. 6,080,835 discloses a functionalized elastomer comprising: a functional group defined by the formula:

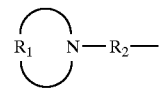

where $R_1$ is a selected from the group consisting of a divalent alkylene group, an oxy-alkylene group, an amino alkylene group, and a substituted alkylene group, each group having from about 6 to about 20 carbon atoms, $R_2$ is covalently bonded to the elastomer and is selected from the group consisting of a linear-alkylene group, a branched-alkylene group, and a cyclo-alkylene group, each group having from about 2 to about 20 carbon atoms.

U.S. Pat. No. 5,932,662 discloses a method of preparing a polymer comprising: preparing a solution of one or more anionically polymerizable monomers in a solvent; and, polymerizing under effective conditions, said monomers in the presence of a polymerization initiator having the formula

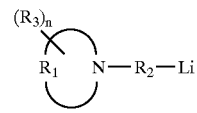

wherein $R_1$ is a divalent alkylene, an oxy- or amino-alkylene having from 6 to about 20 carbon atoms; and, $R_2$ is a linear-alkylene, branched-alkylene, or cyclo-alkylene having from about 2 to about 20 carbon atoms, Li is a lithium atom bonded directly to a carbon atom of $R_2$; and $R_3$ is a tertiary amino, an alkyl having from about 1 to about 12 carbon atoms; an aryl having from about 6 to about 20 carbon atoms; an alkaryl having from about 7 to about 20 carbon atoms; an alkenyl having from about 2 to about 12 carbon atoms; a cycloalkyl having from about 5 to about 20 carbon atoms; a cycloalkenyl having from about 5 to about 20 carbon atoms; a bicycloalkyl having from about 6 to about 20 carbon atoms; and, a bicycloalkenyl having from about 6 to about 20 carbon atoms; where n is an integer of from 0 to about 10.

U.S. Pat. No. 6,084,025 discloses a functionalized polymer prepared by a process comprising the steps of: preparing a solution of a cyclic amine compound, an organolithium compound, and from 3 to about 300 equivalents, based upon one equivalent of lithium, of a monomer selected from vinyl aromatic monomers, and mixtures thereof, where said cyclic amine compound is defined by the formula

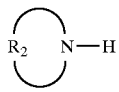

where $R_2$ is selected from the group consisting of an alkylene, substituted alkylene, bicycloalkane, and oxy- or N-alkylamino-alkylene group having from about 3 to about 16 methylene groups, N is a nitrogen atom, and H is a hydrogen atom, thereby forming a polymerization initiator having the formula $A(SOL)_yLi$, where Li is a lithium atom, SOL is a divalent hydrocarbon group having from 3 to about 300 polymerized monomeric units, y is from 0.5 to about 3, and A is a cyclic amine radical derived from said cyclic amine; charging the solution containing $A(SOL)_yLi$ with from about 0.01 to about 2 equivalents per equivalent of lithium of a chelating reagent, and an organic alkali metal compound selected from compounds having the formula $R_4OM$, $R_5C(O)OM$, $R_6R_7NM$, and $R_8SO_3M$, where $R_4$, $R_5$, $R_6$, $R_7$, and $R_8$ are each selected from alkyls, cycloalkyls, alkenyls, aryls, or phenyls, having from 1 to about 12 carbon atoms; and where M is Na, K, Rb or Cs, and sufficient monomer to form a living polymeric structure; and quenching the living polymeric structure.

In the initiator systems of U.S. Pat. No. 6,084,025 a chelating reagent can be employed to help prevent heterogeneous polymerization. The reagents that are reported as being useful include tetramethylethylenediamine (TMEDA), oxolanyl cyclic acetals, and cyclic oligomeric oxolanyl alkanes. The oligomeric oxolanyl alkanes may be represented by the structural formula:

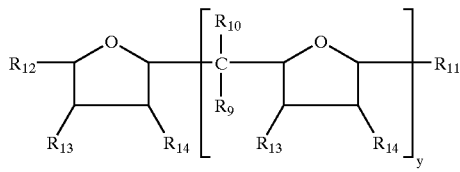

and

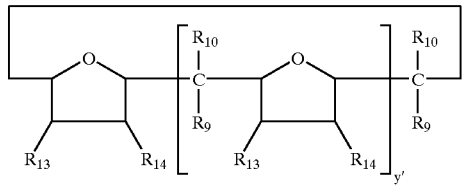

wherein $R_9$ and $R_{10}$ independently are hydrogen or an alkyl group and the total number of carbon atoms in $-CR_9R_{10}-$ ranges between one and nine inclusive; y is an integer of 1 to 5 inclusive; y' is an integer of 3 to 5 inclusive; and $R_{11}$, $R_{12}$, $R_{13}$, and $R_{14}$ independently are $-H$ or $-C_nH_{2n+1}$, wherein n=1 to 6.

U.S. Pat. No. 6,344,538 discloses functionalized monomers and polymerized functionalized monomers selected from the group consisting of 2-(N,N-dimethylaminomethyl)-1,3-butadiene, 2-(N,N-diethylaminomethyl)-1,3-butadiene, 2-(N,N-di-n-propylaminomethyl)-1,3-butadiene, 2-(cyanomethyl)-1,3-butadiene, 2-(aminomethyl)-1,3-butadiene, 2-(hydroxymethyl)-1,3-butadiene, 2-(carboxymethy)-1,3-butadiene, 2-(acetoxymethyl)-1,3-butadiene, 2-(2-alkoxy-2-oxoethyl)-1,3-butadiene, 2,3-bis(cyanomethyl)-1,3-butadiene, 2,3-bis(dialkylaminomethyl)-1,3-butadiene, 2,3-bis(4-ethoxy-4-4-oxobutyl)-1,3-butadiene and 2,3-bis(3-cyanopropyl)-1,3-butadiene, and methods for preparing such functionalized diene monomers and polymers.

SUMMARY OF THE INVENTION

The present invention relates to functionalized monomers that can be polymerized into rubbery polymers having low hysteresis and good compatibility with fillers, such as carbon black and silica. The functionalized monomers of this invention are typically incorporated into the rubbery polymer by being copolymerized with one or more conjugated diolefin monomers and optionally other monomers that are copolymerizable therewith, such as vinyl aromatic monomers. In any case, improved polymer properties are realized because the functionalized monomers of this invention improve the compatibility of the rubber with the types of fillers that are typically used in rubber compounds, such as carbon black and silica.

This invention more specifically discloses monomers that are particularly useful for copolymerization with conjugated diolefin monomers to produce rubbery polymers having better compatibility with fillers. The monomers of this invention are of the structural formula:

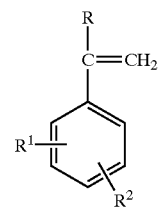

wherein R represents an alkyl group containing from 1 to about 10 carbon atoms or a hydrogen atom, and wherein $R^1$ and $R^2$ can be the same or different and represent hydrogen atoms or a moiety of the structural formula:

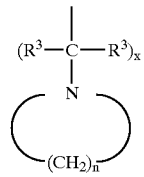

wherein the $R^3$ groups in repeat units and in different repeat units can be the same or different and represent hydrogen atoms or alkyl groups containing from 1 to about 4 carbon atoms, wherein n and x represents integers from 1 to about 10, with the proviso that $R^1$ and $R^2$ can not both be hydrogen atoms.

The present invention also reveals a rubbery polymer which is comprised of repeat units that are derived from (1)

at least one conjugated diolefin monomer, and (2) at least one monomer having the structural formula:

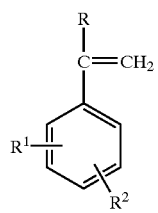

wherein R represents an alkyl group containing from 1 to about 10 carbon atoms or a hydrogen atom, and wherein $R^1$ and $R^2$ can be the same or different and represent hydrogen atoms or a moiety of the structural formula:

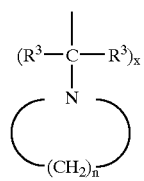

wherein the $R^3$ groups in repeat units and in different repeat units can be the same or different and represent hydrogen atoms or alkyl groups containing from 1 to about 4 carbon atoms, wherein n and x represents integers from 1 to about 10, with the proviso that $R^1$ and $R^2$ can not both be hydrogen atoms.

The subject invention further discloses a process for synthesizing a rubbery polymer that comprises copolymerizing at least one conjugated diolefin monomer and at least one functionalized monomer in an organic solvent at a temperature which is within the range of 20° C. to about 100° C., wherein the polymerization is initiated with an anionic initiator and wherein the functionalized monomer is of the structural formula:

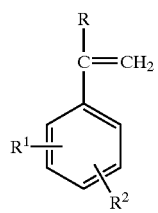

wherein R represents an alkyl group containing from 1 to about 10 carbon atoms or a hydrogen atom, and wherein $R^1$ and $R^2$ can be the same or different and represent hydrogen atoms or a moiety of the structural formula:

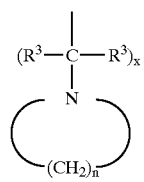

wherein the $R^3$ groups in repeat units and in different repeat units can be the same or different and represent hydrogen atoms or alkyl groups containing from 1 to about 4 carbon atoms, wherein n and x represents integers from 1 to about 10, with the proviso that $R^1$ and $R^2$ can not both be hydrogen atoms.

The present invention also discloses a process synthesizing functionalized styrene monomer that comprises reacting a secondary amine in the presence of a strong base to produce the functionalized styrene monomer.

The subject invention further reveals a tire which is comprised of a generally toroidal-shaped carcass with an outer circumferential tread, two spaced beads, at least one ply extending from bead to bead and sidewalls extending radially from and connecting said tread to said beads, wherein said tread is adapted to be ground-contacting, and wherein said tread is comprised of (I) a filler, and (II) rubbery polymer which is comprised of repeat units that are derived from (1) at least one conjugated diolefin monomer, and (2) at least one monomer having the structural formula:

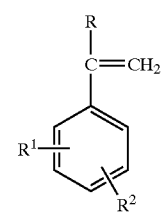

wherein R represents an alkyl group containing from 1 to about 10 carbon atoms or a hydrogen atom, and wherein $R^1$ and $R^2$ can be the same or different and represent hydrogen atoms or a moiety of the structural formula:

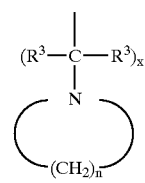

wherein the $R^3$ groups in repeat units and in different repeat units can be the same or different and represent hydrogen atoms or alkyl groups containing from 1 to about 4 carbon atoms, wherein n and x represents integers from 1 to about 10, with the proviso that $R^1$ and $R^2$ can not both be hydrogen atoms.

DETAILED DESCRIPTION OF THE INVENTION

The functionalized monomers of this invention can be copolymerized into virtually any type of synthetic rubber. In most cases the functionalized monomer will be copolymerized with at least one conjugated diolefin monomer, such as 1,3-butadiene or isoprene. Optionally, other monomers that are copolymerizable with conjugated diolefin monomers, such as vinyl aromatic monomers, can also be included in the polymerization. In any case, typically from about 0.1 phm (parts by weight by 100 parts by weight of monomers) to about 99 phm of the functionalized monomer will be included in the polymerization. More typically, from about 0.2 phm to about 50 phm of the functionalized monomer will be included in the rubbery polymer. Good results can normally be attained by including 0.2 phm to 10 phm of the functionalized monomer in the rubbery polymer. It is typically preferred to incorporate from about 0.2 phm to about 2 phm of the functionalized monomer into the rubbery polymer with it being more preferred to incorporate 0.3 phm to 1 phm of the functionalized monomer into the rubbery polymer. For instance, 0.3 phm to 0.7 phm of the functionalized monomer can be incorporated into the rubbery polymer.

In cases where vinyl aromatic monomers, such as styrene or α-methyl styrene, are copolymerized into the rubbery copolymer they will typically be included at a level of 1 phm to about 50 phm. Vinyl aromatic monomers will more typically be incorporated into the rubbery polymer at a level which is within the range of about 10 phm to about 40 phm and most typically be included at a level of about 15 phm to about 30 phm. For instance, the rubbery polymer can be comprised of repeat units that are derived from about 58 weight percent to about 90 weight percent 1,3-butadiene, from about 8 weight percent to about 40 weight percent styrene, and from about 0.2 phm to about 2 phm of the functionalized monomer. Such a rubbery polymer is more typically comprised of repeat units that are derived from about 69 weight percent to about 85 weight percent 1,3-butadiene, from about 14 weight percent to about 30 weight percent styrene, and from about 0.3 phm to about 1 phm of the functionalized monomer.

According to this invention, polymerization and recovery of polymer are suitably carried out according to various methods suitable for diene monomer polymerization processes. This includes batchwise, semi-continuous, or continuous operations under conditions that exclude air and other atmospheric impurities, particularly oxygen and moisture. The polymerization of the functionalized monomers of the invention may also be carried out in a number of different polymerization reactor systems, including but not limited to bulk polymerization, vapor phase polymerization, solution polymerization, suspension polymerization, emulsion polymerization, and precipitation polymerization systems. The commercially preferred methods of polymerization are solution polymerization and emulsion polymerization.

The polymerization reaction may use a free radical initiator, a redox initiator, an anionic initiator, or a cationic initiator. The preferred initiation system depends upon the particular monomers being polymerized and the desired characteristics of the rubbery polymer being synthesized. In emulsion polymerizations free radical initiators are typically utilized. In solution polymerizations anionic initiators, such as alkyl lithium compounds, are typically employed to initiate the polymerization. An advantage of free radical polymerization is that reactions can typically be carried out under less rigorous conditions than ionic polymerizations. Free radical initiation systems also exhibit a greater tolerance of trace impurities.

Examples of free radical initiators that are useful in the practice of the present invention are those known as "redox" initiators, such as combinations of chelated iron salts, sodium formaldehyde sulfoxylate, and organic hydroperoxides. Representative of organic hydroperoxides are cumene hydroperoxide, paramenthane hydroperoxide, and tertiary butyl hydroperoxide. Tertiary butyl hydroperoxide (t-BHP), tertiary butyl peracetate (t-BPA) and "azo" initiators, such as azobisiobutyronitrile (AIBN), are preferred.

The reaction temperature is typically maintained in the range of 0° C. to 150° C. Temperatures between about 20° C. and 120° C. are generally preferred and temperatures within the range of 60° C. to 100° C. are normally most preferred. The reaction pressure is not critical. It is typically only sufficiently high to maintain liquid phase reaction conditions; it may be autogenic pressure, which will vary depending upon the components of the reaction mixture and the temperature, or it may be higher, e.g., up to 1000 psi.

In batch operations, the polymerization time of functionalized diene monomers can be varied as desired; it may vary, for example, from a few minutes to several days. Polymerization in batch processes may be terminated when monomer is no longer absorbed, or earlier, if desired, e.g., if the reaction mixture becomes too viscous. In continuous operations, the polymerization mixture may be passed through a reactor of any suitable design. The polymerization reactions in such cases are suitably adjusted by varying the residence time. Residence times vary with the type of reactor system and range, for example, from 10 to 15 minutes to 24 or more hours.

The concentration of monomer in the reaction mixture may vary upward from 5 percent by weight of the reaction mixture, depending on the conditions employed; the range from 20 to 80 percent by weight is preferred.

The polymerization reactions according to this invention may be carried out in a suitable solvent that is liquid under the conditions of reaction and relatively inert. The solvent may have the same number of carbon atoms per molecule as the diene reactant or it may be in a different boiling range. Preferred as solvents are alkane and cycloalkane hydrocarbons. Suitable solvents are, for example, hexane, cyclohexane, methylcyclohexane, or various saturated hydrocarbon mixtures. Aromatic hydrocarbons such as benzene, toluene, isopropylbenzene, xylene, or halogenated aromatic compounds such as chlorobenzene, bromobenzene, or orthodichlorobenzene may also be employed. Other useful solvents include tetrahydrofuran and dioxane.

Conventional emulsion recipes may also be employed with the present invention; however, some restrictions and modifications may arise either from the polymerizable monomer itself, or the polymerization parameters. Ionic surfactants, known in the art, including sulfonate detergents and carboxylate, sulfate, and phosphate soaps are useful in this invention. The level of ionic surfactant is computed based upon the total weight of the organic components and may range from about 2 to 30 parts by weight of ionic surfactant per 100 parts by weight of organic components.

Preferably the polymerization is carried out to complete functionalized diene monomer conversion in order to incorporate essentially all of the polymerizable functional group-bearing monomer. Incremental addition, or a chain transfer agent, may be used in order to avoid excessive gel formation. Such minor modifications are within the skill of the artisan. After the polymerization is complete, the polymer is recovered from a slurry or solution of the polymer. A simple filtration may be adequate to separate polymer from diluent. Other means for separating polymer from diluent may be employed. The polymer may be treated, separately or while slurried in the reaction mixture, in order to separate residues. Such treatment may be with alcohols such as methanol, ethanol, or isopropanol, with acidified alcohols, or with other similar polar liquids. In many cases the polymers are obtained in hydrocarbon solutions and the polymer can be recovered by coagulation with acidified alcohol, e.g., rapidly stirred methanol or isopropanol containing 2% hydrochloric acid. Following this initial coagulation, the polymers may be washed several more times in methanol.

The functionalized diene monomers according to the present invention may also be polymerized with one or more comonomers. Some adjustments in the polymerization recipe or reaction conditions may be necessary to obtain a satisfactory rate of polymer formation, depending on the amount of functionalized monomer included and the other monomers involved. Examples of comonomers that are useful in the practice of this invention are diene monomers such as 1,3-butadiene, isoprene, and hexadienes. One may, in addition to the diene monomers, use a vinyl monomer such as styrene, α-methylstyrene, divinyl benzene, vinyl chloride, vinyl acetate, vinylidene chloride, methyl methacrylate, ethyl acrylate, vinylpyridine, acrylonitrile, methacrylonitrile, methacrylic acid, itaconic acid and acrylic acid. Mixtures of different functionalized monomers and mixtures of different comonomers may be used. The monomer charge ratio by weight is normally from about 0.10/99.9 to 99.9/0.10 functionalized monomer to comonomer (including any additional vinyl monomer). A charge ratio by weight of about 5/95 to about 80/20 is preferred with 10/90 to 40/60 the most preferred. According to one embodiment, the weight ratio of functionalized diene monomer to diene monomer to vinyl monomer may range from 5:75:20 to 95:5:0. Ratios will vary depending on the amount of chemical functionality desired to be incorporated and on the reactivity ratios of the monomers in the particular polymerization system used.

The functionalized monomers of this invention offer a unique ability to randomly copolymerize with conjugated diolefin monomers in solution polymerizations that are conducted at temperatures of 20° C. or higher. The functionalized monomers of this invention can be incorporated into virtually any type of rubbery polymer that is capable of being made by solution polymerization with an anionic initiator or. The polymerization employed in synthesizing the rubbery polymers will normally be carried out in a hydrocarbon solvent. Such hydrocarbon solvents are comprised of one or more aromatic, paraffinic or cycloparaffinic compounds. These solvents will normally contain from about 4 to about 10 carbon atoms per molecule and will be liquid under the conditions of the polymerization. Some representative examples of suitable organic solvents include pentane, isooctane, cyclohexane, methylcyclohexane, isohexane, n-heptane, n-octane, n-hexane, benzene, toluene, xylene, ethylbenzene, diethylbenzene, isobutylbenzene, petroleum ether, kerosene, petroleum spirits, petroleum naphtha, and the like, alone or in admixture.

In the solution polymerization, there will normally be from 5 to 30 weight percent monomers in the polymerization medium. Such polymerization media are, of course, comprised of the organic solvent and monomers. In most cases, it will be preferred for the polymerization medium to contain from 10 to 25 weight percent monomers. It is generally more preferred for the polymerization medium to contain 15 to 20 weight percent monomers.

The synthetic rubbers made by the process of this invention can be made by random copolymerization of the functionalized monomer with a conjugated diolefin monomer or by the random terpolymerization of the functionalized monomer with a conjugated diolefin monomer and a vinyl aromatic monomer. It is, of course, also possible to make such rubbery polymers by polymerizing a mixture of conjugated diolefin monomers with one or more ethylenically unsaturated monomers, such as vinyl aromatic monomers. The conjugated diolefin monomers which can be utilized in the synthesis of rubbery polymers which can be coupled in accordance with this invention generally contain from 4 to 12 carbon atoms. Those containing from 4 to 8 carbon atoms are generally preferred for commercial purposes. For similar reasons, 1,3-butadiene and isoprene are the most commonly utilized conjugated diolefin monomers. Some additional conjugated diolefin monomers that can be utilized include 2,3-dimethyl-1,3-butadiene, piperylene, 3-butyl-1,3-octadiene, 2-phenyl-1,3-butadiene, and the like, alone or in admixture.

Some representative examples of ethylenically unsaturated monomers that can potentially be polymerized into rubbery polymers that contain the functionalized monomers of this invention include alkyl acrylates, such as methyl acrylate, ethyl acrylate, butyl acrylate, methyl methacrylate and the like; vinylidene monomers having one or more terminal $CH_2$=CH— groups; vinyl aromatics such as styrene, α-methylstyrene, bromostyrene, chlorostyrene, fluorostyrene and the like; α-olefins such as ethylene, propylene, 1-butene and the like; vinyl halides, such as vinylbromide, chloroethene (vinylchloride), vinylfluoride, vinyliodide, 1,2-dibromoethene, 1,1-dichloroethene (vinylidene chloride), 1,2-dichloroethene and the like; vinyl esters, such as vinyl acetate; α,β-olefinically unsaturated nitriles, such as acrylonitrile and methacrylonitrile; α,β-olefinically unsaturated amides, such as acrylamide, N-methyl acrylamide, N,N-dimethylacrylamide, methacrylamide and the like.

Rubbery polymers which are copolymers of one or more diene monomers with one or more other ethylenically unsaturated monomers will normally contain from about 50 weight percent to about 99 weight percent conjugated diolefin monomers and from about 1 weight percent to about 50 weight percent of the other ethylenically unsaturated monomers in addition to the conjugated diolefin monomers. For example, copolymers of conjugated diolefin monomers with vinylaromatic monomers, such as styrene-butadiene rubbers which contain from 50 to 95 weight percent conjugated diolefin monomers and from 5 to 50 weight percent vinylaromatic monomers, are useful in many applications.

Vinyl aromatic monomers are probably the most important group of ethylenically unsaturated monomers which are commonly incorporated into polydiene rubbers. Such vinyl aromatic monomers are, of course, selected so as to be copolymerizable with the conjugated diolefin monomers being utilized. Generally, any vinyl aromatic monomer which is known to polymerize with organolithium initiators can be used. Such vinyl aromatic monomers typically contain from 8 to 20 carbon atoms. Usually, the vinyl aromatic monomer will contain from 8 to 14 carbon atoms. The most widely used vinyl aromatic monomer is styrene. Some examples of vinyl aromatic monomers that can be utilized include styrene, 1-vinylnaphthalene, 2-vinylnaphthalene, α-methylstyrene, 4-phenylstyrene, 3-methylstyrene and the like.

Some representative examples of rubbery polymers that can be functionalized with the functionalized monomers of this invention include polybutadiene, polyisoprene, styrene-butadiene rubber (SBR), α-methylstyrene-butadiene rubber, α-methylstyrene-isoprene rubber, styrene-isoprene-butadiene rubber (SIBR), styrene-isoprene rubber (SIR), isoprene-butadiene rubber (IBR), α-methylstyrene-isoprene-butadiene rubber and α-methylstyrene-styrene-isoprene-butadiene rubber. In cases where the rubbery polymer is comprised of repeat units that are derived from two or more monomers, the repeat units which are derived from the different monomers, including the functionalized monomers, will normally be distributed in an essentially random manner. The repeat units that are derived from the monomers differ from the monomer in that a double bond is normally consumed in by the polymerization reaction.

The rubbery polymer can be made by solution polymerization in a batch process by in a continuous process by continuously charging at least one conjugated diolefin monomer, the functionalized monomer, and any additional monomers into a polymerization zone. The polymerization zone will typically be a polymerization reactor or a series of polymerization reactors. The polymerization zone will normally provide agitation to keep the monomers, polymer, initiator, and modifier well dispersed throughout the organic solvent the polymerization zone. Such continuous polymerizations are typically conducted in a multiple reactor system. The rubbery polymer synthesized is continuously withdrawn from the polymerization zone. The monomer conversion attained in the polymerization zone will normally be at least about 85 percent. It is preferred for the monomer conversion to be at least about 90 percent.

The polymerization will be initiated with an anionic initiator, such as an alkyl lithium compound. The alkyl lithium compounds that can be used will typically contain from 1 to about 8 carbon atoms, such as n-butyl lithium, The amount of the lithium initiator utilized will vary with the monomers being polymerized and with the molecular weight that is desired for the polymer being synthesized. However, as a general rule, from 0.01 to 1 phm (parts per 100 parts by weight of monomer) of the lithium initiator will be utilized. In most cases, from 0.01 to 0.1 phm of the lithium initiator will be utilized with it being preferred to utilize 0.025 to 0.07 phm of the lithium initiator.

The polymerization process of this invention is normally conducted in the presence of polar modifiers, such as alkyltetrahydrofurfuryl ethers. Some representative examples of specific polar modifiers that can be used include methyltetrahydrofurfuryl ether, ethyltetrahydrofurfuryl ether, propyltetrahydrofurfuryl ether, butyltetrahydrofurfuryl ether, hexyltetrahydrofurfuryl ether, octyltetrahydrofurfuryl ether, dodecyltetrahydrofurfuryl ether, diethyl ether, di-n-propyl ether, diisopropyl ether, di-n-butyl ether, tetrahydrofuran, dioxane, ethylene glycol dimethyl ether, ethylene glycol diethyl ether, diethylene glycol dimethyl ether, diethylene glycol diethyl ether, triethylene glycol dimethyl ether, trimethylamine, triethylamine, N,N,N',N'-tetramethylethylenediamine, N-methyl morpholine, N-ethyl morpholine, or N-phenyl morpholine.

The polar modifier will typically be employed at a level wherein the molar ratio of the polar modifier to the lithium initiator is within the range of about 0.01:1 to about 5:1. The molar ratio of the polar modifier to the lithium initiator will more typically be within the range of about 0.1:1 to about 4:1. It is generally preferred for the molar ratio of polar modifier to the lithium initiator to be within the range of about 0.25:1 to about 3:1. It is generally most preferred for the molar ratio of polar modifier to the lithium initiator to be within the range of about 0.5:1 to about 3:2.

The polymerization can optionally be conducted utilizing an oligomeric oxolanyl alkane as the modifier. Such oligomeric oxolanyl alkanes will typically be of a structural formula selected from the group consisting of:

(a)

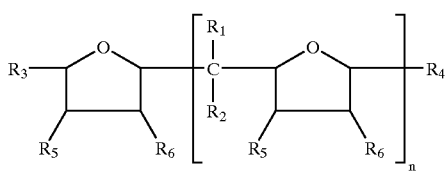

and (b)

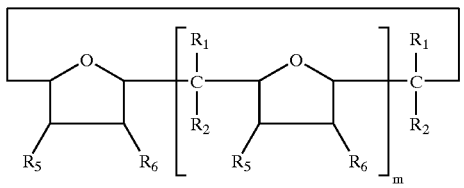

wherein n represents an integer from 1 to 5, wherein m represents an integer from 3 to 5, wherein $R_1$, $R_2$, $R_3$, $R_4$, $R_5$, and $R_6$ can be the same or different, and wherein $R_1$, $R_2$, $R_3$, $R_4$, $R_5$, and $R_6$ represent a member selected from the group consisting of hydrogen atoms and alkyl groups containing from 1 to about 8 carbon atoms. It is typically preferred for $R_1$, $R_2$, $R_3$, $R_4$, $R_5$, and $R_6$ represent a member selected from the group consisting of hydrogen atoms and alkyl groups containing from 1 to 4 carbon atoms.

The polymerization temperature utilized can vary over a broad range of from about −20° C. to about 180° C. In most cases, a polymerization temperature within the range of about 30° C. to about 125° C. will be utilized. It is typically preferred for the polymerization temperature to be within the range of about 45° C. to about 100° C. It is typically most preferred for the polymerization temperature to be within the range of about 60° C. to about 90° C. The pressure used will normally be sufficient to maintain a substantially liquid phase under the conditions of the polymerization reaction.

The polymerization is conducted for a length of time sufficient to permit substantially complete polymerization of monomers. In other words, the polymerization is normally carried out until high conversions of at least about 85 percent are attained. The polymerization is then terminated by the addition of an agent, such as an alcohol, a terminating agent, or a coupling agent. For example, a tin halide and/or silicon halide can be used as a coupling agent. The tin halide and/or the silicon halide are continuously added in cases where asymmetrical coupling is desired. This continuous addition of tin coupling agent and/or the silicon coupling agent is normally done in a reaction zone separate from the zone where the bulk of the polymerization is occurring. The coupling agents will normally be added in a separate reaction vessel after the desired degree of conversion has been attained. The coupling agents can be added in a hydrocarbon solution, e.g., in cyclohexane, to the polymerization admixture with suitable mixing for distribution and reaction. In other words, the coupling will typically be added only after a high degree of conversion has already been attained. For instance, the coupling agent will normally be added only after a monomer conversion of greater than about 85 percent has been realized. It will typically be preferred for the monomer conversion to reach at least about 90 percent before the coupling agent is added.

The tin halides used as coupling agents will normally be tin tetrahalides, such as tin tetrachloride, tin tetrabromide, tin tetrafluoride or tin tetraiodide. However, tin trihalides can also optionally be used. Polymers coupled with tin trihalides having a maximum of three arms. This is, of course, in contrast to polymers coupled with tin tetrahalides which have a maximum of four arms. To induce a higher level of branching, tin tetrahalides are normally preferred. As a general rule, tin tetrachloride is most preferred.

The silicon coupling agents that can be used will normally be silicon tetrahalides, such as silicon tetrachloride, silicon tetrabromide, silicon tetrafluoride or silicon tetraiodide.

However, silicon trihalides can also optionally be used. Polymers coupled with silicon trihalides having a maximum of three arms. This is, of course, in contrast to polymers coupled with silicon tetrahalides which have a maximum of four arms. To induce a higher level of branching, silicon tetrahalides are normally preferred. As a general rule, silicon tetrachloride is most preferred of the silicon coupling agents.

A combination of a tin halide and a silicon halide can optionally be used to couple the rubbery polymer. By using such a combination of tin and silicon coupling agents improved properties for tire rubbers, such as lower hysteresis, can be attained. It is particularly desirable to utilize a combination of tin and silicon coupling agents in tire tread compounds that contain both silica and carbon black. In such cases, the molar ratio of the tin halide to the silicon halide employed in coupling the rubbery polymer will normally be within the range of 20:80 to 95:5. The molar ratio of the tin halide to the silicon halide employed in coupling the rubbery polymer will more typically be within the range of 40:60 to 90:10. The molar ratio of the tin halide to the silicon halide employed in coupling the rubbery polymer will preferably be within the range of 60:40 to 85:15. The molar ratio of the tin halide to the silicon halide employed in coupling the rubbery polymer will most preferably be within the range of 65:35 to 80:20.

Broadly, and exemplary, a range of about 0.01 to 4.5 milliequivalents of tin coupling agent (tin halide and silicon halide) is employed per 100 grams of the rubbery polymer. It is normally preferred to utilize about 0.01 to about 1.5 milliequivalents of the coupling agent per 100 grams of polymer to obtain the desired Mooney viscosity. The larger quantities tend to result in production of polymers containing terminally reactive groups or insufficient coupling. One equivalent of tin coupling agent per equivalent of lithium is considered an optimum amount for maximum branching. For instance, if a mixture tin tetrahalide and silicon tetrahalide is used as the coupling agent, one mole of the coupling agent would be utilized per four moles of live lithium ends. In cases where a mixture of tin trihalide and silicon trihalide is used as the coupling agent, one mole of the coupling agent will optimally be utilized for every three moles of live lithium ends. The coupling agent can be added in a hydrocarbon solution, e.g., in cyclohexane, to the polymerization admixture in the reactor with suitable mixing for distribution and reaction.

After the coupling has been completed, a tertiary chelating alkyl 1,2-ethylene diamine or a metal salt of a cyclic alcohol can optionally be added to the polymer cement to stabilize the coupled rubbery polymer. The tertiary chelating amines that can be used are normally chelating alkyl diamines of the structural formula:

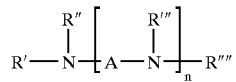

wherein n represents an integer from 1 to about 6, wherein A represents an alkylene group containing from 1 to about 6 carbon atoms and wherein R', R", R''' and R'''' can be the same or different and represent alkyl groups containing from 1 to about 6 carbon atoms. The alkylene group A is of the formula —(—CH$_2$—)$_m$ wherein m is an integer from 1 to about 6. The alkylene group will typically contain from 1 to 4 carbon atoms (m will be 1 to 4) and will preferably contain 2 carbon atoms. In most cases, n will be an integer from 1 to about 3 with it being preferred for n to be 1. It is preferred for R', R", R''' and R'''' to represent alkyl groups which contain from 1 to 3 carbon atoms. In most cases, R', R", R''' and R'''' will represent methyl groups.

In most cases, from about 0.01 phr (parts by weight per 100 parts by weight of dry rubber) to about 2 phr of the chelating alkyl 1,2-ethylene diamine or metal salt of the cyclic alcohol will be added to the polymer cement to stabilize the rubbery polymer. Typically, from about 0.05 phr to about 1 phr of the chelating alkyl 1,2-ethylene diamine or metal salt of the cyclic alcohol will be added. More typically, from about 0.1 phr to about 0.6 phr of the chelating alkyl 1,2-ethylene diamine or the metal salt of the cyclic alcohol will be added to the polymer cement to stabilize the rubbery polymer.

The terminating agents that can be used to stop the polymerization and to "terminate" the living rubbery polymer include tin monohalides, silicon monohalides, N,N,N', N'-tetradialkyldiamino-benzophenones (such as tetramethyldiaminobenzophenone and the like), N,N-dialkylaminobenzaldehydes (such as dimethylaminobenzaldehyde and the like), 1,3-dialkyl-2-imidazolidinones (such as 1,3-dimethyl-2-imidazolidinone and the like), 1-alkyl substituted pyrrolidinones; 1-aryl substituted pyrrolidinones, dialkyl-dicycloalkyl-carbodiimides containing from about 5 to about 20 carbon atoms, and dicycloalkyl-carbodiimides containing from about 5 to about 20 carbon atoms.

After the termination step, and optionally the stabilization step, has been completed, the rubbery polymer can be recovered from the organic solvent. The coupled rubbery polymer can be recovered from the organic solvent and residue by means such as chemical (alcohol) coagulation, thermal desolventization, or other suitable method. For instance, it is often desirable to precipitate the rubbery polymer from the organic solvent by the addition of lower alcohols containing from about 1 to about 4 carbon atoms to the polymer solution. Suitable lower alcohols for precipitation of the rubber from the polymer cement include methanol, ethanol, isopropyl alcohol, normal-propyl alcohol and t-butyl alcohol. The utilization of lower alcohols to precipitate the rubbery polymer from the polymer cement also "terminates" any remaining living polymer by inactivating lithium end groups. After the coupled rubbery polymer is recovered from the solution, steam-stripping can be employed to reduce the level of volatile organic compounds in the coupled rubbery polymer. Additionally, the organic solvent can be removed from the rubbery polymer by drum drying, extruder drying, vacuum drying, and the like.

The polymers of the present invention can be used alone or in combination with other elastomers to prepare an rubber compounds, such as a tire treadstock, sidewall stock or other tire component stock compounds. In a tire of the invention, at least one such component is produced from a vulcanizable elastomeric or rubber composition. For example, the rubbery polymer made by the process of this invention can be blended with any conventionally employed treadstock rubber which includes natural rubber, synthetic rubber and blends thereof. Such rubbers are well known to those skilled in the art and include synthetic polyisoprene rubber, styrene/butadiene rubber (SBR), polybutadiene, butyl rubber, Neoprene, ethylene/propylene rubber, ethylene/propylene/diene rubber (EPDM), acrylonitrile/butadiene rubber (NBR), silicone rubber, the fluoroelastomers, ethylene acrylic rubber, ethylene vinyl acetate copolymer (EVA), epichlorohydrin rubbers, chlorinated polyethylene rubbers, chlorosulfonated polyethylene rubbers, hydrogenated nitrile rubber, tetrafluoroethylene/propylene rubber and the like.

When the rubbery polymers made by the process of the present invention are blended with conventional rubbers, the amounts can vary widely such as between 10 and 99 percent by weight. In any case, tires made with synthetic rubbers that are synthesized utilizing the technique of this invention exhibit decreased rolling resistance. The greatest benefits are realized in cases where the tire tread compound is made with the rubbery polymer synthesized utilizing the technique of this invention. However, benefits can also by attained in cases where at least one structural element of the tire, such as subtread, sidewalls, body ply skim, or bead filler, is comprised of the rubbery.

The synthetic rubbers made in accordance with this invention can be compounded with carbon black in amounts ranging from about 5 to about 100 phr (parts by weight per 100 parts by weight of rubber), with about 5 to about 80 phr being preferred, and with about 40 to about 70 phr being more preferred. The carbon blacks may include any of the commonly available, commercially-produced carbon blacks but those having a surface area (EMSA) of at least 20 m$^2$/g and more preferably at least 35 m$^2$/g up to 200 m$^2$/g or higher are preferred. Surface area values used in this application are those determined by ASTM test D-1765 using the cetyltrimethyl-ammonium bromide (CTAB) technique. Among the useful carbon blacks are furnace black, channel blacks and lamp blacks. More specifically, examples of the carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. Other carbon blacks which may be utilized include acetylene blacks. Mixtures of two or more of the above blacks can be used in preparing the carbon black products of the invention. Typical values for surface areas of usable carbon blacks are summarized in the following table.

| Carbon Black | |
|---|---|
| ASTM Designation (D-1765-82a) | Surface Area (D-3765) |
| N-110 | 126 m$^2$/g |
| N-220 | 111 m$^2$/g |
| N-330 | 83 m$^2$/g |
| N-339 | 95 m$^2$/g |
| N-550 | 42 m$^2$/g |
| N-660 | 35 m$^2$/g |

The carbon blacks utilized in the preparation of rubber compounds may be in pelletized form or an unpelletized flocculent mass. Preferably, for more uniform mixing, unpelletized carbon black is preferred. The reinforced rubber compounds can be cured in a conventional manner with about 0.5 to about 4 phr of known vulcanizing agents. For example, sulfur or peroxide-based curing systems may be employed. For a general disclosure of suitable vulcanizing agents one can refer to Kirk-Othmer, Encyclopedia of Chemical Technology, 3rd ed., Wiley Interscience, N.Y. 1982, Vol. 20, pp. 365–468, particularly "Vulcanization Agents and Auxiliary Materials" pp. 390–402. Vulcanizing agents can, of curse, be used alone or in combination. Vulcanizable elastomeric or rubber compositions can be prepared by compounding or mixing the polymers thereof with carbon black and other conventional rubber additives such as fillers, plasticizers, antioxidants, curing agents and the like, using standard rubber mixing equipment and procedures and conventional amounts of such additives.

The functionalized styrene monomer can be synthesized by reacting a secondary amine with vinyl aromatic halide, such as vinyl benzyl chloride, in the presence of a strong base to produce the functionalized styrene monomer. This procedure can be depicted as follows:

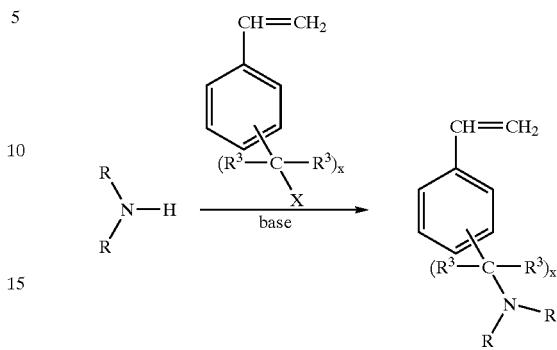

wherein x represents an integer from 1 to about 10 and wherein X represents a halogen atom. In most cases x will represent an integer from 1 to about 4. It is normally preferred for x to represent the integer 1 or the integer 2.

This reaction is typically conducted at a temperature which is within the range of about −20° C. to about 40° C., and is preferably conducted at a temperature which is within the range of about −10° C. to about 30° C. This reaction will most preferable be conducted at a temperature which is within the range of about 0° C. to about 25° C. The strong base can be selected from a large variety of organic or inorganic compounds. Examples of organic bases are aromatic and aliphatic amines, pyridines, such as triethylamine, aniline, and pyridine. Examples of suitable inorganic bases are the salts of weak mineral acids such has sodium carbonate, calcium carbonate, sodium hyrdroxide, calcium hydroxide, and aluminum hyrdoxide. After the reaction has been completed volatile compounds are removed under reduced pressure yielding the product as a viscous residue.

Functionalized monomers that contain cyclic amines can also be made by the same reaction scheme wherein a cyclic secondary amine is employed in the first step of the reaction. This reaction scheme can be depicted as follows:

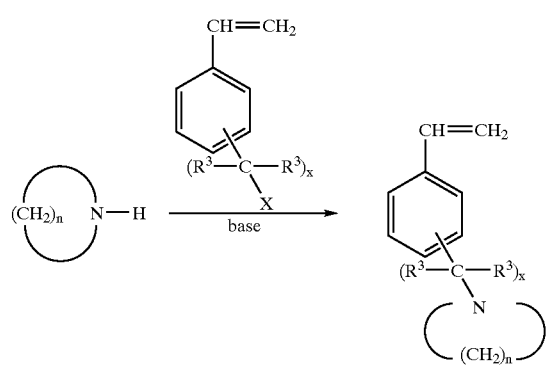

wherein x represents an integer from 1 to about 10, wherein n represents an integer from about 4 to about 10, and wherein X represents a halogen atom. In most cases x will represent an integer from 1 to about 4, and n will be an integer from 4 to about 7. It is normally preferred for x to represent the integer 1 or the integer 2, and for n to represent the integer 4 or 6.

The functionalized styrene monomers that can be used in the practice of this invention are typically of the structural formula:

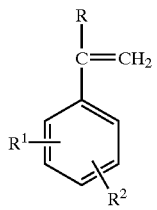

wherein R represents an alkyl group containing from 1 to about 10 carbon atoms or a hydrogen atom, and wherein $R^1$ and $R^2$ can be the same or different and represent hydrogen atoms or a moiety of the structural formula:

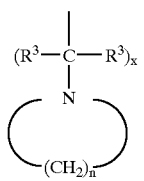

wherein the $R^3$ groups in repeat units and in different repeat units can be the same or different and represent hydrogen atoms or alkyl groups containing from 1 to about 4 carbon atoms, wherein n and x represents integers from 1 to about 10, with the proviso that $R^1$ and $R^2$ can not both be hydrogen atoms. In these monomers R will typically represent a hydrogen atom or a methyl group, x will typically represent an integer from 1 to about 4, and n will be an integer from 4 to about 7. It is normally preferred for x to represent the integer 1 or the integer 2, and for n to represent the integer 4 or 6.

Functionalized styrene monomers of the following structural formulas:

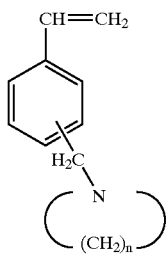

wherein n represents an integer from 4 to about 10 are highly useful in the practice of this invention. In these functionalized styrene monomers n will normally represents 4 or 6.

The nitrogen containing heterocyclic group (Z group) will normally be one of the following moieties:

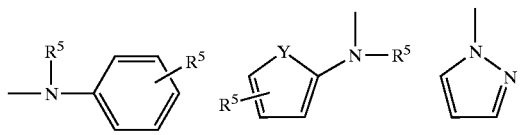

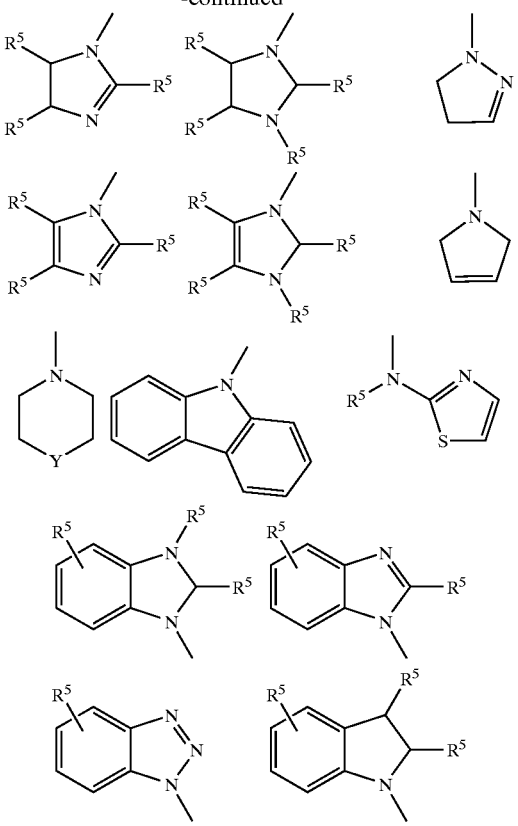

wherein $R^5$ groups can be the same or different and represent a member selected from the group consisting of alkyl groups containing from 1 to about 10 carbon atoms, aryl groups, allyl groups, and alkoxy groups, and wherein Y represents oxygen, sulfur, or a methylene group.

This invention is illustrated by the following examples that are merely for the purpose of illustration and are not to be regarded as limiting the scope of the invention or the manner in which it can be practiced. Unless specifically indicated otherwise, parts and percentages are given by weight.

EXAMPLES

Synthesis of 1-[(4-ethenylphenyl)methyl]-pyrrolidine

A 1 L (liter) round bottom flask was charged with hexane (400 mL) and 4-vinylbenzyl chloride (104.4 g, 0.68 moles). The reaction flask was placed into an ice/water bath and stirred with a magnetic stir bar. Two equivalents of pyrrolidine (130 g, 1.37 moles) were added over the course of 1 hour. After completed addition the ice/water bath was removed and the reaction was stirred at room temperature overnight. Solids were removed via vacuum filtration and volatiles were removed under vacuum to render the product in quantitative yield.

Materials

Butadiene premixes were made using distilled 1,3-butadiene supplied by Exxon and hexanes (a mixture of hexane isomers) supplied by Ashland Chemicals, and subsequently passed over an activated silica gel/3A molecular sieve column under dry nitrogen prior to use. Styrene premixes were made using styrene and hexanes, both supplied by Ashland Chemicals, and subsequently passed over an activated silica gel/3A molecular sieve/sodium hydroxide column under dry nitrogen prior to use. N',N',N,N-tetramethylethylenediamine (TMEDA) was purchased from Aldrich Chemical, diluted to 1.60M using anhydrous hexane, and held under dry nitrogen and over 3A molecular sieves. A solution of n-butyllithium (n-BuLi) in hexanes (1.60M) was obtained from Chemetall Foote and used without further treatment. A solution of pyrrolidinopropyl lithium (PP-Li, chain extended with isoprene) in cyclohexane (0.93M) was obtained from Chemetall Foote and used without further treatment. N-methylpyrrolidino-substituted styrene was diluted to 1.87M using anhydrous hexane.

Polymerization

Sample A

To a one-gallon (3.785 liter) glass bowl reactor was added 1,428 grams butadiene premix at 18.2 weight percent butadiene and 572 grams styrene premix at 15.2 weight percent styrene. Following the monomer premix addition, 1.87 mmoles of TMEDA (1:1 molar ratio to lithium) was injected into the reactor. Finally, 2.35 mmoles of n-BuLi (including 0.48 mmoles as scavenger) was injected into the reactor, followed by approximately 4 mL of dried hexanes to flush the injection port. The reaction temperature was maintained at 65° C. The polymerization was terminated after two hours and full conversion using a slight molar excess of ethanol to n-BuLi. The terminated cement was stabilized using 2,6-di-t-butyl-4-methylphenol (BHT) at 1.0 phr polymer and subsequently dried using a lab-scale steam-heated drum dryer.

Sample B

To a one-gallon (3.785 liter) glass bowl reactor was added 1,428 grams butadiene premix at 18.2 weight percent butadiene and 572 grams styrene premix at 15.2 weight percent styrene. Following the monomer premix addition, 3.46 mmoles (2:1 molar ratio to lithium, ~0.2 weight percent total monomer) of N-methylpyrrolidino-substituted styrene monomer was injected into the reactor, followed by approximately 4 mL of dried hexanes to flush the injector port. Next, 1.73 mmoles of TMEDA (1:1 molar ratio to lithium) was injected into the reactor. Finally, 2.19 mmoles of n-BuLi (including 0.46 mmoles as scavenger) was injected into the reactor, followed by approximately 4 mL of dried hexanes to flush the injection port. The reaction temperature was maintained at 65° C. The polymerization was terminated after two hours and full conversion using a slight molar excess of ethanol to n-BuLi. The terminated cement was stabilized using BHT at 1.0 phr polymer and subsequently dried using a lab-scale steam-heated drum dryer.

Sample C

To a one-gallon (3.785 liter) glass bowl reactor was added 1,451 grams butadiene premix at 17.2 weight percent butadiene and 549 grams styrene premix at 15.2 weight percent styrene. Following the monomer premix addition, 17.95 mmoles (~1.0 weight percent total monomer) of N-methylpyrrolidino-substituted styrene monomer was injected into the reactor, followed by approximately 4 mL of dried hexanes to flush the injector port. Next, 1.66 mmoles of TMEDA (1:1 molar ratio to lithium) was injected into the reactor. Finally, 3.36 mmoles of n-BuLi (including 1.70 mmoles as scavenger) was injected into the reactor, followed by approximately 4 mL of dried hexanes to flush the injection port. The reaction temperature was maintained at 65° C. The polymerization was terminated after two hours and full conversion using a slight molar excess of ethanol to n-BuLi. The terminated cement was stabilized using BHT at 1.0 phr polymer and subsequently dried using a lab-scale steam-heated drum dryer.

Sample D

To a one-gallon (3.785 liter) glass bowl reactor was added 1,451 grams butadiene premix at 17.2 weight percent butadiene and 549 grams styrene premix at 15.2 weight percent styrene. Following the monomer premix addition, 1.90 mmoles of TMEDA (1:1 molar ratio to lithium) was injected into the reactor. Finally, 2.20 mmoles of n-BuLi (including 0.30 mmoles as scavenger) was injected into the reactor, followed by approximately 4 mL of dried hexanes to flush the injection port. The reaction temperature was maintained at 65° C. After two hours, 3.80 mmoles of N-methylpyrrolidino-substituted styrene monomer (2:1 molar ratio to lithium, ~0.2 weight percent total monomer) was injected into the reactor, followed by approximately 4 mL of dried hexanes to flush the injection port. After 15 minutes, the polymerization was terminated using a slight molar excess of ethanol to n-BuLi. The terminated cement was stabilized using BHT at 1.0 phr polymer and subsequently dried using a lab-scale steam-heated drum dryer.

Sample E

To a one-gallon (3.785 liter) glass bowl reactor was added 1,439 grams butadiene premix at 17.7 weight percent butadiene and 561 grams styrene premix at 15.2 weight percent styrene. Following the monomer premix addition, 1.74 mmoles of TMEDA (1:1 molar ratio to lithium) was injected into the reactor. Finally, 2.13 mmoles of PP-Li (including 0.39 mmoles as scavenger) was injected into the reactor, followed by approximately 4 mL of dried hexanes to flush the injection port. The reaction temperature was maintained at 65° C. The polymerization was terminated after two hours and full conversion using a slight molar excess of ethanol to lithium. The terminated cement was stabilized using BHT at 1.0 phr polymer and subsequently dried using a lab-scale steam-heated drum dryer.

Characterization

Several standard techniques were utilized to characterize both the cement solutions and the dried polymer products. During polymerization, essentially complete monomer conversion after two hours reaction time was confirmed by gas chromatography on a Hewlett Packard 5890 Series II Gas Chromatogram with a 60 m×0.250 mm DB-5 column at 0.25 micron. Size exclusion chromatography SEC was performed via Polymer Labs multiple C microgel columns (with guard column) using THF as the carrier solvent and for sample preparation. Multi-angle laser light scattering measurements were carried out using a Wyatt Technologies miniDawn light scattering detector and a Hewlett Packard 1047A refractive index detector. Glass transition temperature analyses were performed on a TA Instruments 2910 DSC using a 10° C./min linear heat rate. Mooney Large ¼ viscosity measurements were acquired using a Monsanto Mooney Viscometer. Table 1 shows the characterization results for the five samples synthesized for this study.

TABLE 1

Characterization results for Samples A–E.

| Sample ID | Comment | Mooney | Mn (g/mole) | Mw (g/mole) | PDI | Onset T2 (C) |
|---|---|---|---|---|---|---|
| Sample A | n-BuLi control | 60 | 212,800 | 224,300 | 1.05 | −33 |
| Sample B | ~0.2 wt % functional monomer, random | 66 | 214,100 | 227,700 | 1.06 | −37 |
| Sample C | ~1.0 wt % functional monomer, random | 62 | 252,300 | 306,900 | 1.22 | −40 |
| Sample D | ~0.2 wt % functional monomer, capped | 65 | 240,600 | 276,800 | 1.15 | −36 |
| Sample E | PP-Li | 70 | 227,100 | 245,100 | 1.08 | −36 |

Compounding

Samples A–E were mixed in a standard carbon black formulation using a 75 cc Haake mixer. The formulation included 100 parts polymer, 55 parts carbon black, 10 parts process oil, 3 parts zinc oxide, 2 parts stearic acid and 1.5 parts antioxidant in the nonproductive stage, and after cooling, an additional 1.2 parts sulfenamide accelerator and 1.4 parts sulfur in the productive stage. The nonproductive stage was mixed for five minutes at 120° C. and 100 rpm, and the productive stage was mixed for three minutes at 100° C. and 60 rpm.

Compound Analysis

A Monsanto Rubber Process Analyzer 2000 was used to measure the viscoelastic properties of the five compounded samples. Of particular interest was the relationship between tan delta at 5% strain, 1.0 Hz and 100° C. versus uncured storage modulus G' at 15% strain, 8.33 Hz and 100° C. This relationship gives an indication of the hysteresis of the compound (lower tan delta is better) versus its processability (lower G' is better). Table 2 shows the results of the analysis for the five compounded samples. One important result is that at equal modulus, the 1.0 wt. % functional monomer sample is approximately 23% less hysteretic than the PP-Li sample.

TABLE 2

Viscoelastic data for five compounded samples.

| Sample ID | Comment | G' at 8.33 Hz | tan delta at 5% strain | tan delta % improvement |
|---|---|---|---|---|
| Sample A | n-BuLi control | 562 | 0.173 | — |
| Sample B | ~0.2 wt % functional monomer, random | 606 | 0.135 | 22.3% |
| Sample C | ~1.0 wt % functional monomer, random | 645 | 0.106 | 38.7% |
| Sample D | ~0.2 wt % functional monomer, capped | 584 | 0.149 | 13.9% |
| Sample E | PP-Li | 644 | 0.137 | 21.1% |

While certain representative embodiments and details have been shown for the purpose of illustrating the subject invention, it will be apparent to those skilled in this art that various changes and modifications can be made therein without departing from the scope of the subject invention.

What is claimed is:

1. A rubbery polymer which is comprised of repeat units that are derived from (1) at least one conjugated diolefin monomer, and (2) at least one functionalized monomer having the structural formula:

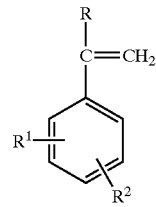

wherein R represents an alkyl group containing from 1 to about 10 carbon atoms or a hydrogen atom, and wherein $R^1$ and $R^2$ can be the same or different and represent hydrogen atoms or a moiety of the structural formula:

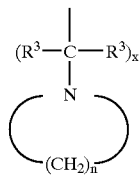

wherein the $R^3$ groups in repeat units and in different repeat units can be the same or different and represent hydrogen atoms or alkyl groups containing from 1 to about 4 carbon atoms, wherein n and x represents integers from 1 to about 10, with the proviso that $R^1$ and $R^2$ can not both be hydrogen atoms.

2. A rubbery polymer as specified in claim 1 wherein n represents an integer from 4 to about 7.

3. A rubbery polymer as specified in claim 2 wherein R represents a hydrogen atom or a methyl group.

4. A rubbery polymer as specified in claim 3 wherein $R^1$ represents a hydrogen atom and wherein $R^2$ represents a moiety of the structural formula:

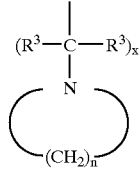

wherein x represents an integer from 1 to about 4.

5. A rubbery polymer as specified in claim 4 wherein n represents the integer 4.

6. A rubbery polymer as specified in claim 4 wherein n represents the integer 6.

7. A rubbery polymer as specified in claim 5 wherein $R^3$ represents. hydrogen atoms or methyl groups.

8. A rubbery polymer as specified in claim 6 wherein $R^3$ represents hydrogen atoms or methyl groups.

9. A rubbery polymer as specified in claim 7 wherein x represents the integer 1.

10. A rubbery polymer as specified in claim 8 wherein x represents the integer 1.

11. A rubbery polymer as specified in claim 7 wherein x represents the integer 2.

12. A rubbery polymer as specified in claim 8 wherein x represents the Integer 2.

13. A rubbery polymer as specified in claim 1 wherein from about 0.2 weight percent to about 10 weight percent of the repeat units in the rubbery polymer are derived from the functionalized monomer.

14. A rubbery polymer as specified in claim 2 wherein from about 0.2 weight percent to about 2 weight percent of the repeat units in the rubbery polymer are derived from the functionalized monomer.

15. A rubbery polymer as specified in claim 3 wherein from about 0.3 weight percent to about 1 weight percent of the repeat units in the rubbery polymer are derived from the functionalized monomer.

16. A rubbery polymer as specified in claim 5 wherein from about 0.3 weight percent to about 0.7 weight percent of the repeat units in the rubbery polymer are derived from the functionalized monomer.

17. A rubbery polymer as specified in claim 6 wherein from about 0.3 weight percent to about 0.7 weight percent of the repeat units in the rubbery polymer are derived from the functionalized monomer.

18. A rubbery polymer as specified in claim 1 wherein said rubbery polymer is coupled with a tin halide and/or a silicon halide.

19. A rubbery polymer as specified in claim 1 wherein the rubbery polymer is further comprised of repeat units that are derived from a vinyl aromatic monomer.

20. A rubbery polymer as specifed in claim 19 wherein the conjugated diolefin monomer is 1,3-butadiene, wherein the vinyl aromatic monomer is styrene, wherein the 1,3-butadiene is included at a level which is within the range of 58 weight percent to 90 weight percent, wherein thc styrene is included at a level which is within the range of 8 weight percent to 40 weight percent, and wherein the functionalized monomer is included at a level which is within the range of 0.2 weight percent to 2 weight percent.

* * * * *